May 18, 1943  W. P. WINTERS  2,319,281
CONVEYER
Filed May 17, 1941
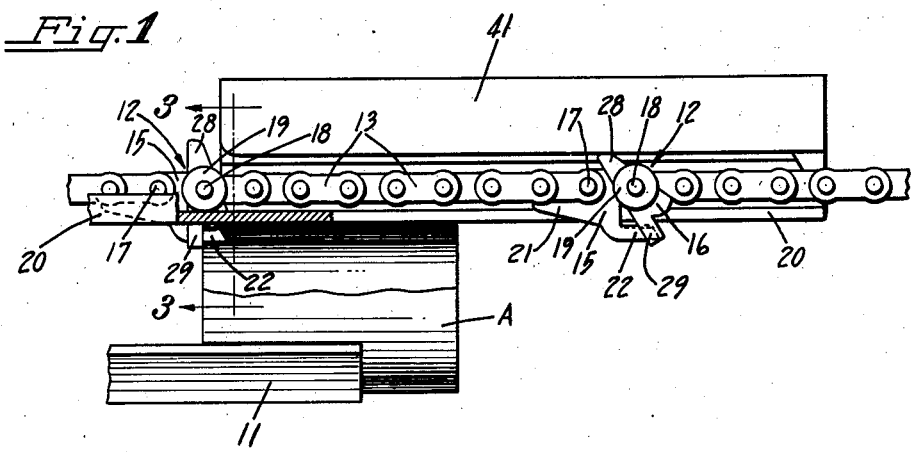
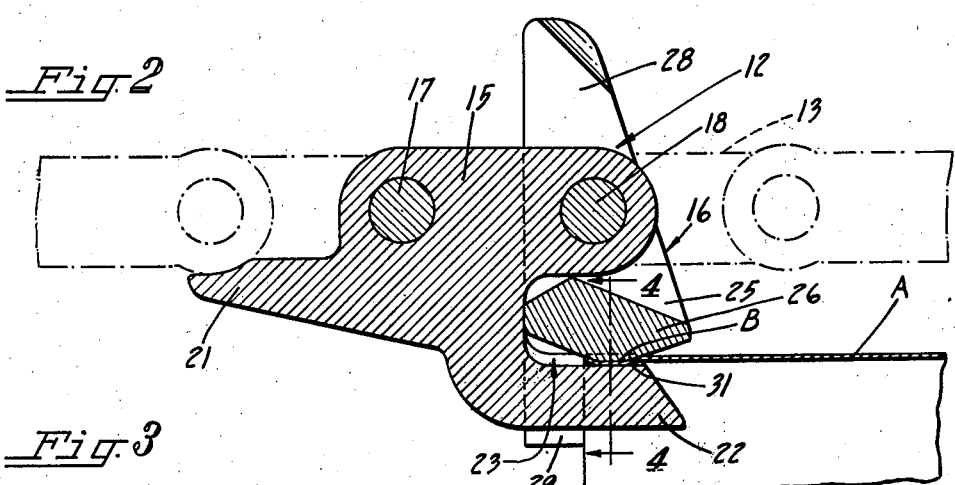
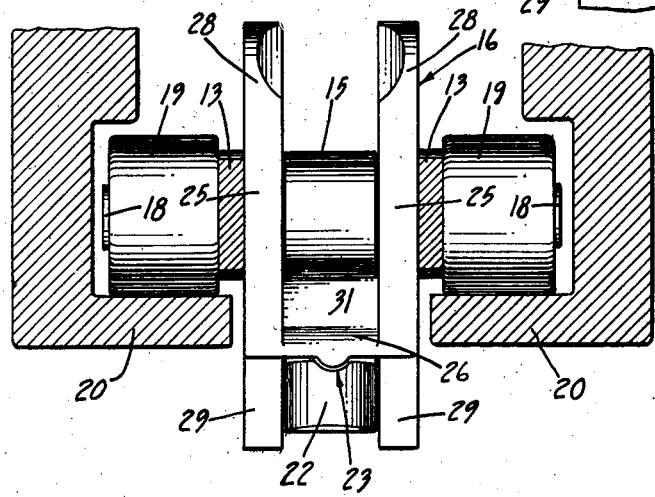
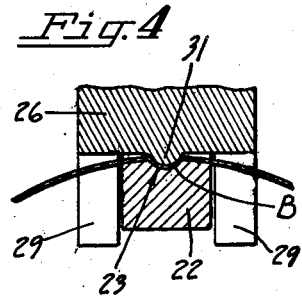
INVENTOR
William P. Winters
BY Ivan D. Thornburgh
Chas H. Orme
ATTORNEYS Patented May 18, 1943

2,319,281

UNITED STATES PATENT OFFICE 2,319,281

CONVEYER

William P. Winters, Cincinnati, Ohio, assignor to American Can Company, New York, N. Y., a corporation of New Jersey Application May 17, 1941, Serial No. 394,001

3 Claims. (Cl. 198—179)

The present invention relates to conveyers for propelling container or can bodies through side seam soldering machines and the like and has particular reference to a conveyer gripper finger for holding the can bodies in a predetermined position relative to the conveyer.

In propelling sheet metal can bodies through a side seam soldering machine, the can bodies sometimes rotate sufficiently to throw the side seam out of alignment with the solder applying elements. Hence the solder sometimes is applied to a can body in a place other than the side seam and the seam thus remains unsoldered.

The instant invention contemplates overcoming this difficulty by providing on the conveyer, gripper fingers which are formed with a key to grip and clinch can bodies in a manner which prevents rotation while they are being propelled through the machine.

An object therefore of the invention is the provision on a conveyor of gripper fingers which grip can bodies with a key action and hold them against rotation while they are being propelled through the machine so that the side seam of the body will be maintained positively in a predetermined position.

Another object is the provision of such a gripper finger which will grip can bodies of varying thickness of stock when the bodies are to be held and which will release the bodies for discharge when desired so that jamming of the can bodies will be prevented.

Another object is the provision of gripper fingers of this character which will hold the can bodies in uniformly spaced order and in a predetermined location on the conveyer so that the bodies will be in proper position for subsequent operations.

Numerous other objects and advantages of the invention will be apparent as it is better understood from the following description, which, taken in connection with the accompanying drawing, discloses a preferred embodiment thereof.

Referring to the drawing:

Figure 1 is a side elevation of a portion of a machine having a conveyer embodying the instant invention, the view showing a can body held in place on the conveyer by a gripper finger, parts being broken away;

Fig. 2 is an enlarged longitudinal section of a portion of the conveyer and a gripper finger carried thereon with a can body in place, with parts broken away;

Fig. 3 is an enlarged transverse section taken substantially along the line 3—3 in Fig. 1, with the can body omitted and with parts broken away; and Fig. 4 is a sectional detail taken substantially along the line 4—4 in Fig. 2.

As a preferred embodiment of the invention the drawing illustrates a portion of a can body side seam soldering machine of the character disclosed in United States Patent 1,178,946, issued April 11, 1916, to F. Rudolphi et al., on Soldering machine. In such a machine tubular sheet metal can bodies A are propelled along longitudinal guide rails 11 while in a horizontal position (Fig. 1) by gripper fingers 12 which are spaced along an endless roller chain conveyer 13.

There are a plurality of the guide rails 11 constituting an outside horn arranged so that the can bodies may pass freely along the inside of the horn, thus confining them against lateral displacement. The horn guides the can bodies along a conventional solder roll which applies molten solder to the side seams of the bodies in the usual manner.

The gripper fingers 12 which grip the can bodies while they are propelled along the horn, are preferably made in two parts, a link or carrier part 15 (Figs. 2 and 3) and a clamping dog 16. The link part 15 is formed similar to a block chain link and constitutes a part of the conveyer chain, the link being secured in place by pivot pins 17, 18 which connect it to adjacent links in the chain. The pivot pin 18 carries rollers 19 which ride on tracks 20 and thus the conveyer chain is supported.

The link 15 is formed with a rearwardly extending lug 21 which engages against the adjacent roller link in the chain and thus prevents the gripper finger 12 as a unit from tipping when the gripper finger is carrying a can body. The link is formed with a depending fixed jaw 22 which projects forwardly of the link. The top surface of the jaw is curved transversely (see also Fig. 4) and is formed with a longitudinal groove 23 having a curved bottom.

The clamping dog 16 is formed with a pair of spaced upright side members 25 which are located one on each side of the link 15. These side members are mounted on the pivot pin 18 and they are formed integrally with a tie-section or clamp jaw 26 which is normally disposed just above the jaw 22 of the link. The side members extend above the pivot pin 18 in the form of tail sections 28 and they also depend below the clamp jaw 26 where they constitute stop lugs 29.

The bottom of the clamp jaw 26 preferably is of wedge shape as best shown in Fig. 2 and is formed with an integral, longitudinal depending ridge or key projection 31 (Figs. 3 and 4). This ridge key projection 31 is located in vertical alignment with the groove 23 in the fixed jaw 22 and cooperates with the groove in clamping the can body in the gripper finger 12, as will now be explained.

In accordance with usual can making practice, the side seam soldering machine is connected to a body making machine. The can bodies leave the body making machine with their side seams down and in the proper position for soldering and are introduced into the horn 11 in this position. The can bodies received in the horn are in the path of travel of the gripper fingers 12 and as a set of the latter come into position adjacent a can body the fixed jaw 22 enters the body so that the wall of the body is interposed between the fixed jaw and the clamp jaw 26 of the clamp dog 16.

The rear edge of the body engages against the depending stop lugs 29 of the clamp dog 16 and as the gripper finger 12 continues to move forward, the stationary can body presses against the stop lugs and thus rocks the clamp dog on its pivot pin 18 until the clamp jaw 26 engages against the link 15. This engagement arrests further rocking movement of the clamp dog. The rear edge of the can body thus is located positively relative to the conveyer chain and the different can bodies held by the different gripper fingers spaced along the chain are thus in positive spaced relation.

The rocking of the clamp dog 16 on its pivot pin 8 by the can body brings the clamp jaw 26 down on top of the body wall and the ridge key projection 31 thereupon bends the body wall adjacent its outer edge and forces it into the groove 23 of the link foot 22. This bending action forms a depression in the body wall and results in an inwardly extending bead B in the can body.

In this manner the can body is clamped in the gripper fingers 12 irrespective of the thickness of the body wall and the bead locks the clamped body against rotation relative to the finger. Thus the body is retained positively in a predetermined position while it travels along with the conveyer and this insures proper location of the body side seam when it passes over the solder roll. With gripping fingers having such a locking feature all can bodies are gripped equally well even though the thickness of the body wall varies within predetermined limits.

At the end of its path of travel along the guide rails 11 the can body is released from a gripper finger 12. This is effected preferably by a stationary cam 41 (Fig. 1) which is located adjacent the path of travel of the gripper fingers. The upwardly projecting tail sections 28 of the clamp dogs 16 engage against this cam as the grippers fingers move past and the clamp dogs are rocked in a direction opposite to that used for locking the can body into place. Rocking of the clamp dog in this reverse direction lifts its clamp jaw 26 out of engagement with the can body and at the same time rocks the stop lugs 29 against the rear edge of the body. These stop lugs thus strip the body from the gripper fingers.

Release of the clamp dog 16 from the can body takes place when body and finger are nearing the terminal ends of the guide rails 11. Hence when the released can body rides off the ends of the rails, it falls from the gripper fingers 12 to any suitable place of deposit. The discharged can bodies usually are subjected to a subsequent flanging operation and in this operation the locking bead B formed in the can body by the gripper fingers 12 is ironed out entirely and in no way interferes with the functioning of the can body when it is embodied subsequently in a container.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A gripping device for can bodies and the like, comprising a pair of jaws capable of relative movement, one of said jaws having means to hold it against turning relative to a can body engaged thereby, a lug engageable and movable by the can body for bringing said jaws together to clamp a wall of the can body therebetween, an integral ridge projecting from the face of one of said jaws and cooperating with an aligning recess in the face of the opposing jaw to form a locking indentation in the wall of the can body when the jaws are in clamping position whereby to lock the can body positively against rotation relative to the jaws.

2. A conveyer having a device thereon for gripping can bodies and the like, comprising in combination, a link chain conveyer, a carrier part constituting a link of said conveyer, a fixed jaw on said carrier part and having a recess in its face, a clamp dog pivotally connected to said carrier part, a clamp jaw on said dog spaced relative to said fixed jaw, and a stop lug on said dog extending across the space between the jaws and engageable by an edge of the can body for bringing said jaws together with the can body in between, said clamp jaw having an integral ridge projecting from its face in alignment with the recess in the face of said fixed jaw for cooperation with said recess to form a locking indentation in the wall of the can body when the jaws are in clamping position whereby to lock the can body positively against rotation relative to the jaws.

3. A chain conveyer having work grippers for can bodies and the like, each of said grippers comprising a relatively fixed link part having a depending jaw, a finger pivotally mounted on said fixed part and having a wedge-shaped clamp jaw adapted to cooperate with said fixed jaw by and upon engagement with a can body to grip said body therebetween, a key-forming projection on one of said jaws, the opposing jaw being formed with a recessed portion adapted to align and cooperate with said projection during said can gripping operation to form a key indentation in said body thereby providing added locking means against rotation relative to said jaws, and a lug on said link part adapted to bear upon a rearwardly adjacent link whereby to support said fixed part against turning upon impact with a can body.

WILLIAM P. WINTERS.